E. D. CHAMBERLAIN.
Elastic Faced Printing Types.
No. 229,869. Patented July 13, 1880.
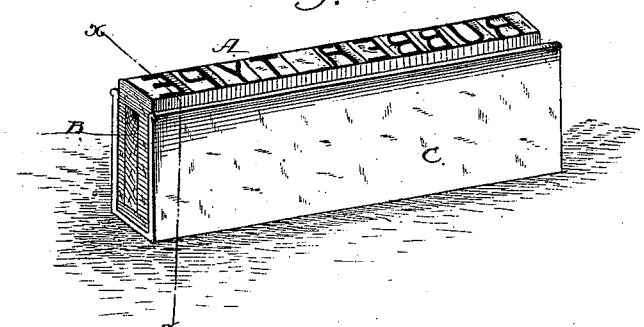
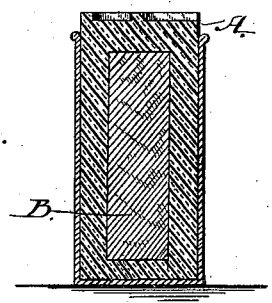
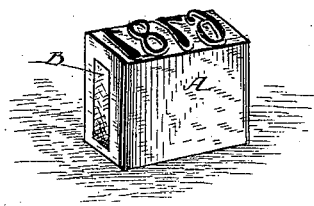
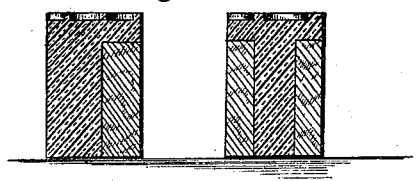
Attest:
T. Walter Fowler,
Jno. L. Coudron.
Inventor
Edmund D. Chamberlain
by A. H. Evans & Co
Attorneys.
N. PETERS, PHOTO-LITHOGRAPHER, WASHINGTON, D C.

UNITED STATES PATENT OFFICE.

EDMUND D. CHAMBERLAIN, OF WESTFIELD, ASSIGNOR OF ONE-HALF OF HIS RIGHT TO STEPHEN J. MARDEN, OF NEWARK, NEW JERSEY.

ELASTIC-FACED PRINTING-TYPE.

SPECIFICATION forming part of Letters Patent No. 229,869, dated July 13, 1880.

Application filed December 1, 1879.

*To all whom it may concern:*

Be it known that I, EDMUND D. CHAMBERLAIN, of Westfield, Union county, New Jersey, have invented certain new and useful Improvements in Elastic-Faced Printing-Types; and I hereby declare the following to be a full, clear, and exact description, reference being had to the accompanying drawings, making a part of this specification, in which—

Figure 1 shows a series of my improved types within a clamp. Fig. 2 is a cross-section of the same exaggerated in size. Fig. 3 is a perspective view of a type. Fig. 4 shows a modification of my invention.

My invention relates to printing-types having an elastic printing-face and adapted to be set up singly or in sets in any ordinary stamp or form to make up and print any desired matter; and it consists of the ordinary rubber type provided with a wooden or other suitable core or stiffening for holding the rubber type in position, in a manner hereinafter described.

To enable others skilled in the art to make and use my invention, I will proceed to describe the exact manner in which I have carried it out.

The object of my invention is to provide a rubber type sufficiently stiff to retain its form and place when locked up for use, as the rubber, being elastic, is easily pressed out of shape and place by the operation of clamping.

In the drawings, A represents my improved types having an outer covering of rubber, with a core or stiffening, B, of wood or other suitable substance, and the whole vulcanized together.

It is evident that the rubber type may extend along one side only, or two sides of the stiffening material, and not entirely cover it, without departing from the spirit of my invention; or the rubber type may be placed between the pieces of wood or other stiffening material, as shown in Fig. 4, as I do not confine myself to any particular manner of applying the stiffening material, as the result sought to be produced is the same in all.

C is a clamp, usually made of sheet-brass, for clamping and holding a series of types while being used, as shown in Fig. 1.

The rubber types as usually made are too soft and limber to be pushed into clamp C after the sides of the clamp have been sufficiently sprung together to bind and hold the type in proper position, and unless they are placed in the clamp smoothly and held firmly the impressions will be uneven and out of line.

I am aware that it is not new to attach rubber type to small pieces or blocks of wood; and I am also aware that rubber type-faces have been secured to metallic bodies, and neither of these do I claim as my invention.

I am also aware that types for hand-stamps have been stiffened by horizontal strips of metal and wood, as shown in Gray's Patent No. 200,711, but such is not my invention; but

What I claim as my invention, and desire to secure by Letters Patent, is—

As an improved manufacture, a type or logotype consisting of the rubber body A and wooden stiffening material B, united substantially as described.

EDMUND D. CHAMBERLAIN.

Witnesses:
ABRAHAM WILLIAMS,
CHAS. HABERLEY.